(12) United States Patent
Chen et al.

(10) Patent No.: US 8,937,595 B2
(45) Date of Patent: Jan. 20, 2015

(54) OPTICAL TOUCH CONTROL APPARATUS AND ADJUSTABLE LIGHT GUIDE APPARATUS

(71) Applicant: PixArt Imaging Inc., Hsin-Chu (TW)

(72) Inventors: Hsin-Chia Chen, Hsin-Chu (TW);
Feng-Cheng Yang, Hsin-Chu (TW);
Ching-Lin Chung, Hsin-Chu (TW);
Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 178 days.

(21) Appl. No.: 13/802,659

(22) Filed: Mar. 13, 2013

(65) Prior Publication Data

US 2014/0049470 A1    Feb. 20, 2014

(30) Foreign Application Priority Data

Aug. 15, 2012   (TW) .............................. 101129468 A

(51) Int. Cl.
*G06F 3/02*   (2006.01)
*F21V 8/00*   (2006.01)

(52) U.S. Cl.
CPC ..................................... *G02B 6/008* (2013.01)
USPC ............................ 345/166; 362/613; 362/616

(58) Field of Classification Search
None
See application file for complete search history.

(56) References Cited

U.S. PATENT DOCUMENTS

| | | | |
|---|---|---|---|
| 2010/0245274 A1* | 9/2010 | Fukuda | 345/173 |
| 2011/0012856 A1* | 1/2011 | Maxwell et al. | 345/173 |
| 2011/0109533 A1* | 5/2011 | Suzuki | 345/84 |
| 2011/0141005 A1* | 6/2011 | Jung et al. | 345/102 |
| 2011/0199336 A1* | 8/2011 | Kao et al. | 345/175 |
| 2012/0299856 A1* | 11/2012 | Hasui | 345/173 |
| 2013/0044081 A1* | 2/2013 | Wu et al. | 345/175 |
| 2014/0049470 A1* | 2/2014 | Chen et al. | 345/166 |

\* cited by examiner

*Primary Examiner* — Peter Vincent Agustin
(74) *Attorney, Agent, or Firm* — Winston Hsu; Scott Margo

(57) ABSTRACT

An optical touch control apparatus, for detecting displacement between an object and the optical touch control apparatus. The optical touch control apparatus comprises: an object detecting apparatus, for detecting the object to generate an object image, having a first detecting area in a first mode and having a second detecting area in a second mode, wherein the first detecting area is larger than the second detecting area; an image sensor, for capturing at least one frame of the object image; and a control unit, for adjusting an image capturing area of the image sensor, according which one of the first detecting area and the second detecting area the object detecting apparatus utilizes.

20 Claims, 9 Drawing Sheets

(a)

(b)

(a)

(b)

OPTICAL TOUCH CONTROL APPARATUS AND ADJUSTABLE LIGHT GUIDE APPARATUS

BACKGROUND OF THE INVENTION

1. Field of the Invention

The present invention relates to an optical touch control apparatus, and an adjustable light guide apparatus, and particularly relates to an optical touch control apparatus, and an adjustable light guide apparatus that can change image capturing range.

2. Description of the Prior Art

A mouse utilizing a scrolling ball or a tracking ball is gradually replaced with an optical mouse or an optical touch control apparatus. Such optical mouse or optical touch control apparatus all determine displacement between a detecting surface of an apparatus and an object (ex. a finger or a surface on which a mouse moves).

FIG. 1 illustrates an optical touch control apparatus 100, which is utilized to detect displacement for an object on a detecting surface. FIG. 1(a) is a cross-sectional diagram of the optical touch control apparatus 100, while FIG. 1(b) is a block diagram illustrating circuits, which are inside the optical touch control apparatus and utilized to control the operation of the optical touch control apparatus. The optical touch control apparatus 100 includes an object detecting apparatus 102 (including a detecting surface 103 and a light source 105), an image sensor 107, lens 109, 111, a control unit 113, a storage apparatus 115 and a light source control unit 117. The object detecting apparatus 102 detects an object image of an object. Specifically, the light source 105 is controller by the light source control unit 117 to control the illumination operation thereof to illuminate a finger 101 on the detecting surface 103 to generate an image. Also, the image sensor 107 captures frames in the image. The control unit 113 computes displacement of the finger 101 according to caught frames. Additionally, the control unit 113 also controls data accessing of the storage apparatus 115 and the operation of the light source control unit 117.

The above-mentioned object detecting apparatus can further comprise a light guide plate besides the detecting surface 103 and the light source 105 shown in FIG. 1. As shown in FIG. 2, the object detecting apparatus 202 includes a detecting surface 203, a light source 205 and a light guide plate 207. The light source 2-5 emits light into the light guide plate 207, and then the light guide plate 207 guides the light to the finger 201 on the detecting surface 203 and generates the image according to the reflected light. The image sensor 211 captures the frames via the lens 209.

However, the image capturing range of the above-mentioned object detecting apparatus is fixed. That is, the image capturing range may occupy most part of the detecting surface, even all of the detecting surface. However, a large image capturing range is not always needed. For example, an user may only needs to move up or move down the frame shown on the screen while seeing data on a website, thus only a narrow image capturing range is needed for the move up/move down action. Therefore, if the image capturing range can not be changed, the image sensor will consume power to ineffective image capturing range and the light source must illuminate a larger range, thus power consumption increases.

SUMMARY OF THE INVENTION

Therefore, one objective of the present invention is to provide an optical touch control apparatus that can adjust the image capturing range.

Another embodiment of the present invention is to provide an adjustable light guide apparatus.

One embodiment of the present invention discloses an optical touch control apparatus, for detecting displacement between an object and the optical touch control apparatus. The optical touch control apparatus comprises: an object detecting apparatus, for detecting the object to generate an object image, having a first detecting area in a first mode and having a second detecting area in a second mode, wherein the first detecting area is larger than the second detecting area; an image sensor, for capturing at least one frame of the object image; and a control unit, for adjusting an image capturing area of the image sensor, according which one of the first detecting area and the second detecting area the object detecting apparatus utilizes.

Another embodiment of the present invention discloses an adjustable light guide apparatus, having a first light guiding area in the first mode and having a second light guiding area in the second mode, wherein the first light guiding area is larger than the second light guiding area. The adjustable light guide apparatus comprises: a light source control unit; a light guide plate; and a plurality of light sources; wherein the light source control unit controls the illumination of the light sources such that the light sources generate the first light guiding area on the light guide plate in the first mode and generate the second light guiding area on the light guide plate in the second mode.

In view of above-mentioned embodiment, the size of the light guiding area can be adjusted according to different requirements, to thereby adjust the sizes of the object detecting areas and to thereby adjust the image capturing range of the image sensor. By this way, the power efficiency can be optimized.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
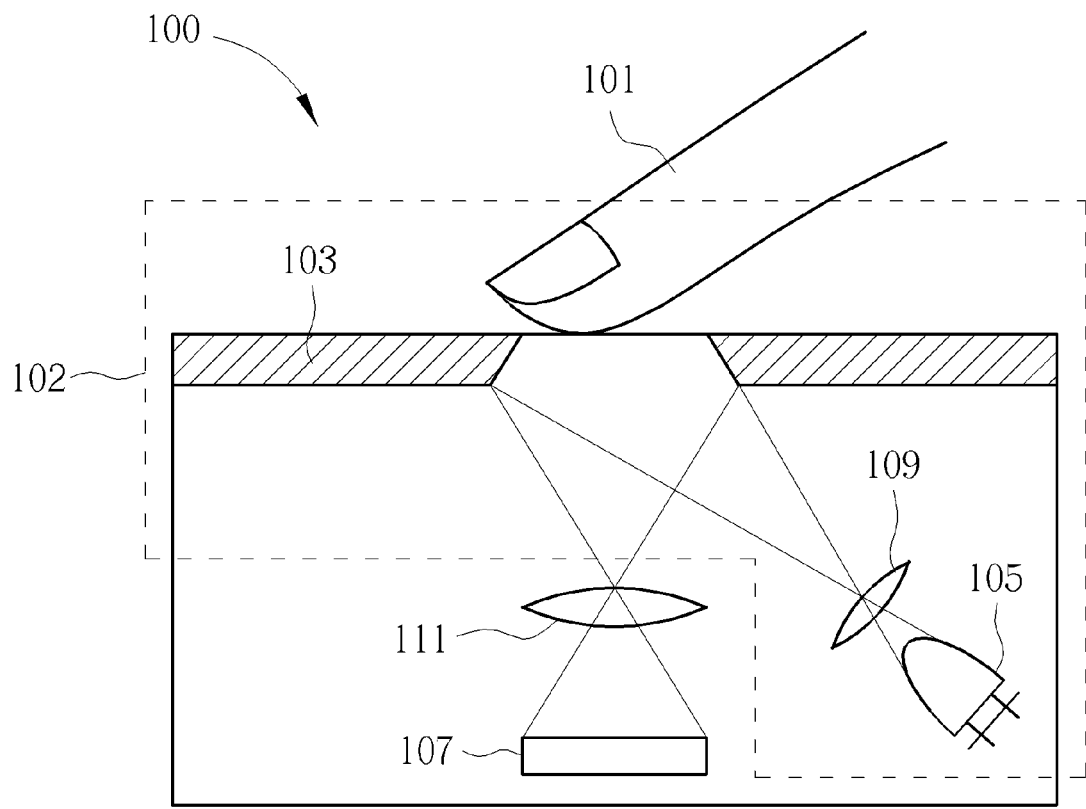
FIG. 1(a) and FIG. 1(b) are respectively a cross-sectional diagram and a block diagram of a prior art optical touch control apparatus.
Figure 1:
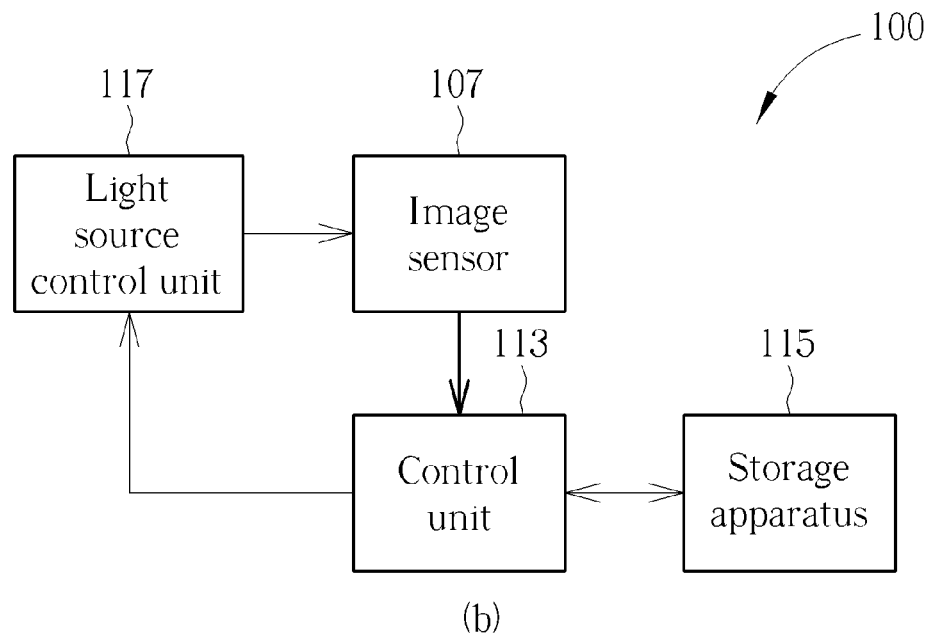
Figure 2:
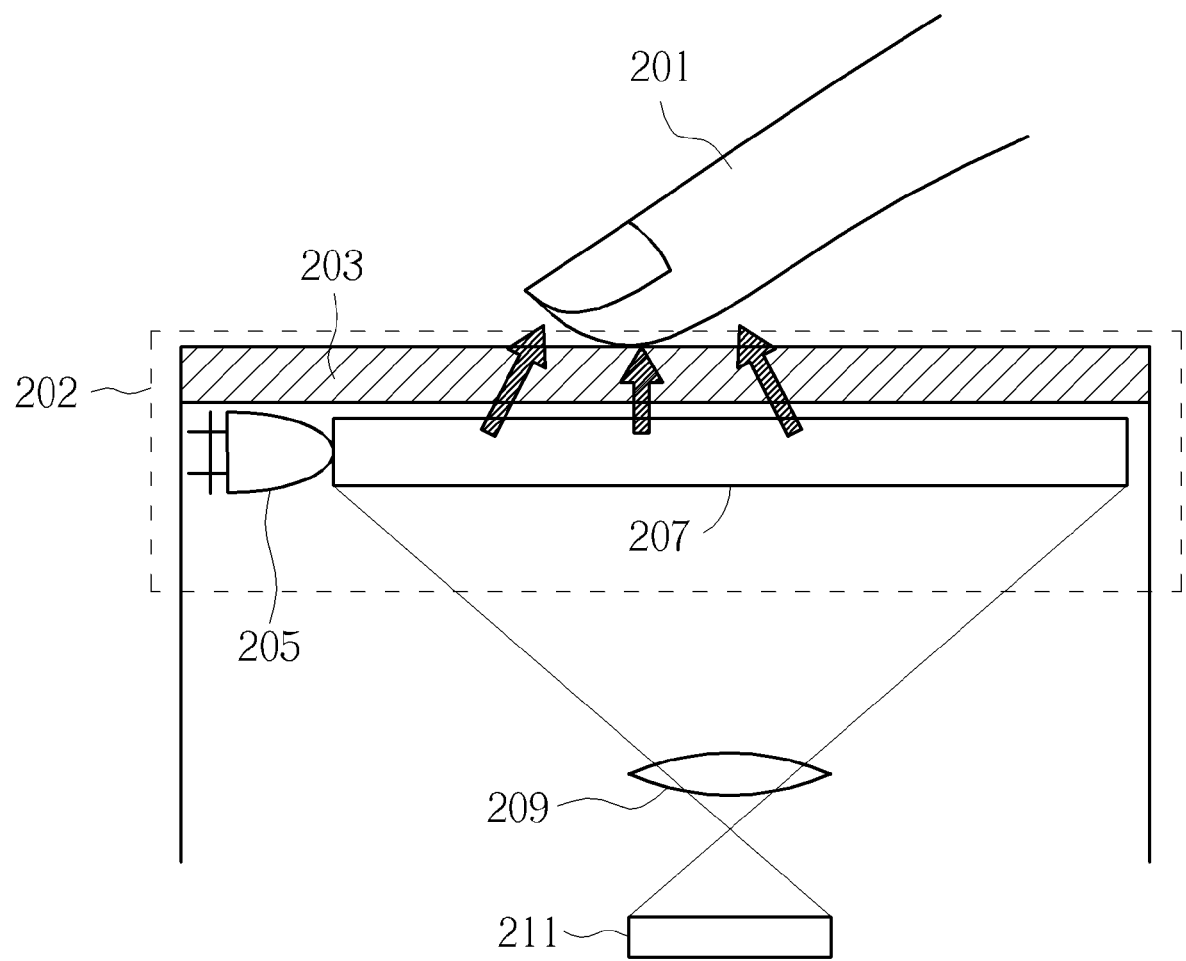
FIG. 2 is a schematic diagram illustrating a prior art object detecting apparatus including a light guide plate.

FIG. 3(a) and FIG. 3(b) are schematic diagrams illustrating optical touch control apparatuses according to embodiments of the present invention, which are both top views. As shown in FIG. 3(a). the object detecting apparatus 301 includes a larger image detecting area (the area marked by oblique lines) in the first mode. Also, as shown in FIG. 3(b), the object detecting apparatus 301 includes a smaller image detecting area in the second mode. The control unit in the optical touch control apparatus 300 adjusts an image capturing area of the image sensor, according which one of the first detecting area and the second detecting area the object detecting apparatus utilizes. The optical touch control apparatus 300 in FIG. 3(a) and FIG. 3(b) can utilize the structures shown in FIG. 1 and FIG. 2. Therefore, the optical touch control apparatus 300 can be summarized as: an object detecting apparatus, for detecting the object (ex. fingers 101, 201 in FIG. 1 and FIG. 2) to generate an object image, having a first detecting area in a first mode and having a second detecting area in a second mode, wherein the first detecting area is larger than the second detecting area; an image sensor (ex. 107 and 211 in FIG. 1 and FIG. 2), for capturing at least one frame of the object image; and a control unit (ex. 113 in FIG. 1), for adjusting an image capturing area of the image sensor, according which one of the first detecting area and the second detecting area the object detecting apparatus utilizes. Please note above-mentioned embodiments do not mean to limit the scope of the present invention. For example, it is not limited that only a middle part can be utilized in the second mode, and the optical touch control apparatus is not limited to include only two modes.

Many methods can be utilized to adjust a detecting area of the object detecting apparatus, which will be explained for more detail below. One of the methods is, providing an adjustable light guide apparatus to the optical touch control apparatus, and changing the light guiding area thereof to adjust detecting areas of the object detecting apparatus. The adjustable light guide apparatus has a first light guiding area in the first mode shown in FIG. 3(a), and has a second light guiding area smaller than the first light guiding area in the second mode shown in FIG. 3(b). The first light guiding area corresponds to the first detecting area and the second light guiding area corresponds to the second detecting area. FIG. 4 to FIG. 8 are schematic diagram respectively illustrating adjustable light guide apparatuses according to embodiments of the present invention. Please note above-mentioned embodiments do not mean to limit the scope of the present invention. For example, it is not limited that only a middle part can be utilized in the second mode.

In FIG. 4(a) and FIG. 4(b), the adjustable light guide apparatus includes a light source control unit 401, a light guide plate 402, and a plurality of light sources 403, 405 and 407. The light source control unit 401 controls the illumination of the light sources 403-407 such that the light sources generate the first light guiding area (the area marked by oblique lines) on the light guide plate 402 in the first mode shown in FIG. 4(a), and generate the second light guiding area on the light guide plate 402 in the second mode shown in FIG. 4(b). Specifically, the light guide plate 402 includes light guiding blocks 409, 411 and 413, which all include the same sizes. In the first mode, the light sources 403, 405 and 407 all illuminate such that light passes through all the light guiding blocks 409, 411 and 413 to form the first light guiding area. Additionally, in the second mode, only the light source 405 illuminates such that only the light guiding block 411 has enough light passing through to form the second light guiding area. Please note the light source number, the arrangement and the operations thereon in the first mode and the second mode are not limited to the embodiments shown in FIG. 4(a) and FIG. 4(b).

In another embodiment, the adjustable light guide apparatus includes a plurality of light guide plates. A first number of the light sources illuminate to form the first light guiding area in the first mode, and a second number of the light sources illuminate to form the second light guiding area in the second mode. For example, in the embodiments shown in FIG. 5(a) and FIG. 5(b), the light guide apparatus includes a light guiding area adjusting apparatus 501, light sources 503, 505, 507 and light guide plates 509, 511 and 513 that are connected to each other. In the first mode, the light guiding area adjusting apparatus 501 controls the light guide plates 509, 511 and 513 to form a first light guiding area as shown in FIG. 5(a). In the second mode, the light guiding area adjusting apparatus 501 controls the light guide plates 509, 511 and 513 to fold, such that the light guide plates 509, 511 and 513 overlap while saw from a top view. FIG. 5(c) illustrates one example of the structure for the light guide plates 509, 511 and 513, which is viewed from the X direction in the embodiment shown in FIG. 5(b), but it does not mean to limit. According to FIG. 5(c), only the light guide plate 511 reveals since the light guide plates 509, 511 and 513 overlap. Comparing with the embodiments shown in FIG. 4(a) and FIG. 4(b), the embodiments shown in FIG. 5(a), FIG. 5(b) and FIG. 5(c) change the arrangement for the light guide plate to change the sizes of the light guiding area rather than utilize light sources.

Figure 6:
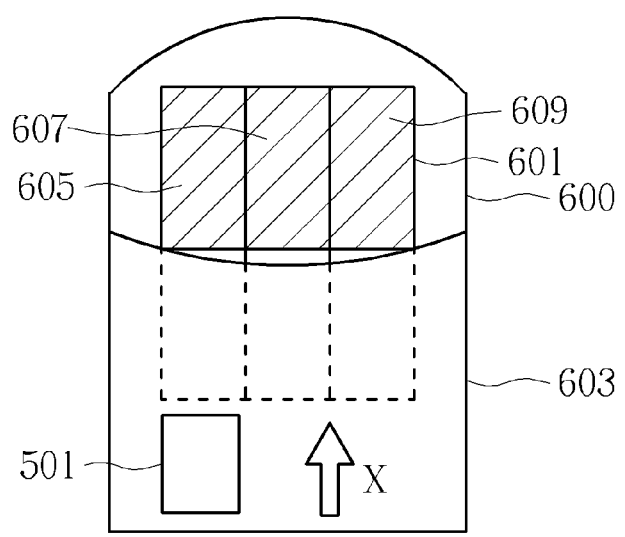
Figure 6:
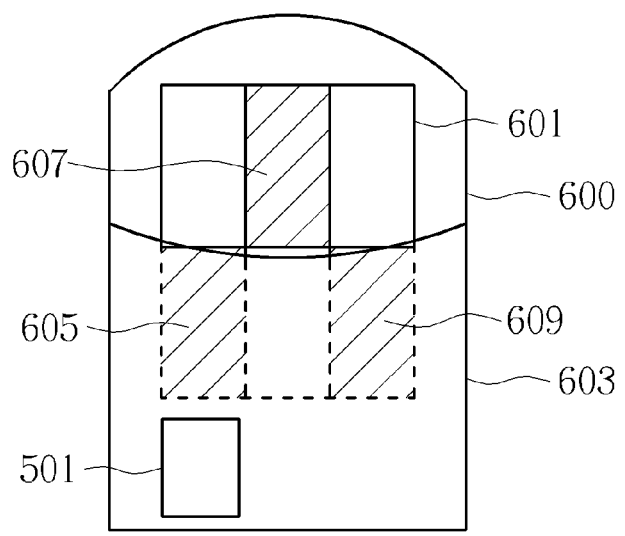

In the embodiment shown in FIG. 6, the adjustable light guide apparatus is included in an optical touch control apparatus 600 including a case 603. The optical touch control apparatus 600 can be replaced with other types of apparatuses, however. The adjustable light guide apparatus can include a plurality of light guide plates 605, 607 and 609 located under the detecting surface 601 of the optical touch control apparatus 600. In the first mode shown in FIG. 6(a), the light guide plates 605, 607 and 609 protrude out the case 603 and form a larger first light guiding area. In the second mode shown in FIG. 6(b), the light guide plates 605 and 609 hide under the case 603 but the light guide plate 607 is still under the detecting surface 601, such that a second light guiding area is formed. The optical touch control apparatus 600 also includes the light guiding area adjusting apparatus 501 to control the operation of the light guide plate.

Figure 7:
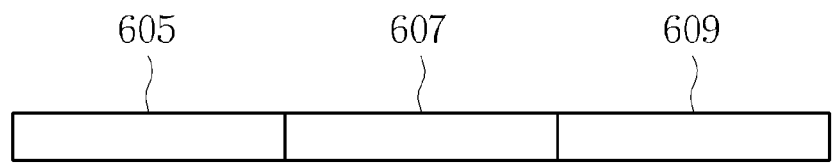
Figure 8:
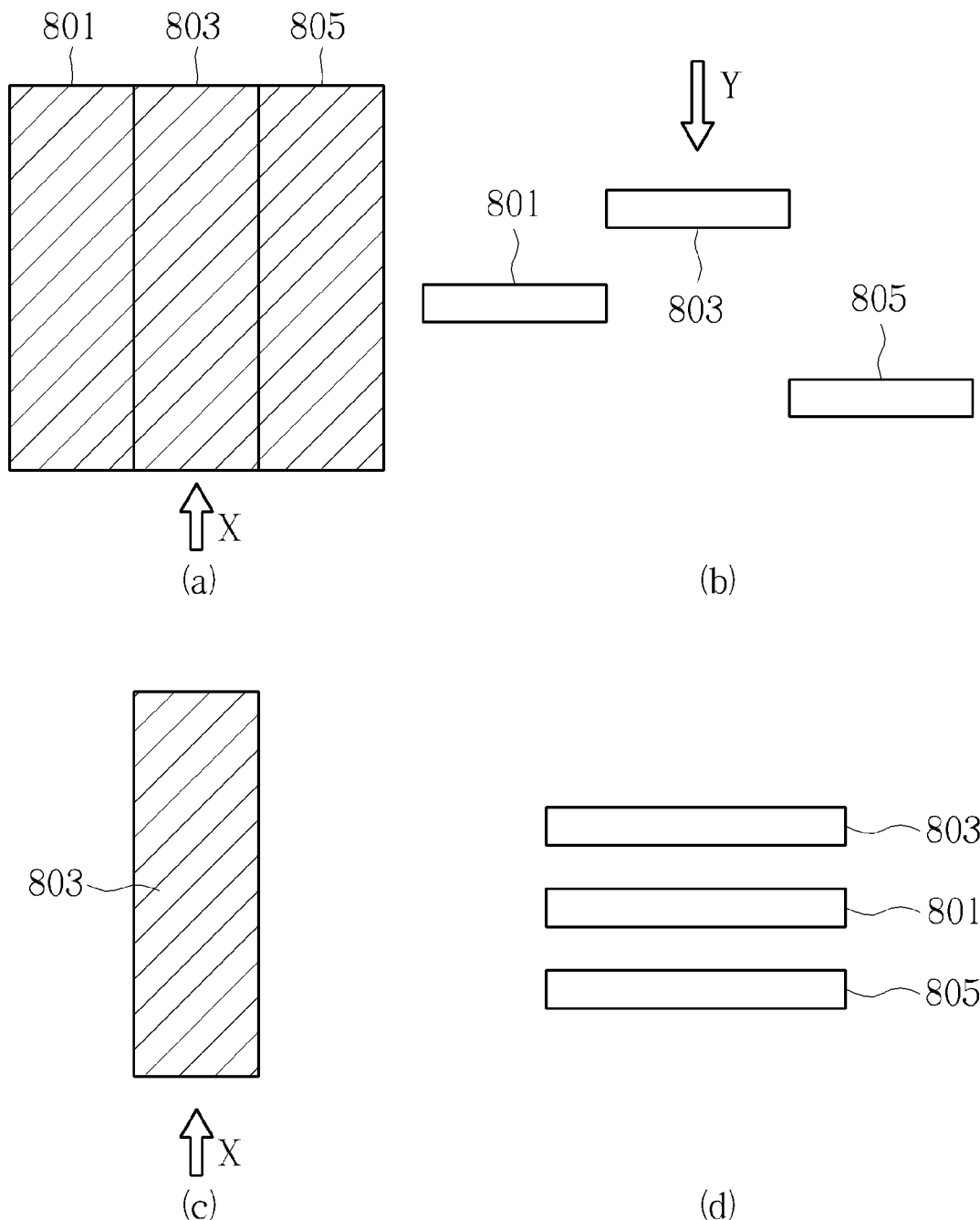

In the embodiment shown in FIG. 6, the light guide plates in the first mode have the same locations in a vertical direction. FIG. 7 is a schematic diagram illustrating the arrangement of light guide plates while seeing in the X direction in FIG. 6. According to FIG. 7, the light guide plates 605, 607, 609 have the same locations in a vertical direction, that is, they are on the same plane. In the embodiments shown in FIG. 8(a), FIG. 8(b), the light guide plates have different locations in a vertical direction, that is, they are on different planes. In FIG. 8(a), the first light guiding area formed by the light guide plates 801, 803 and 805 has the same size as which of the embodiment shown in FIG. 6(a), but light guide plates 801, 803 and 805 have different locations in a vertical direction. FIG. 8(b) is a schematic diagram illustrating the light guide plates arrangement while seeing in the X direction in FIG. 8(a). According to FIG. 8(b), the light guide plates 801, 803 and 805 are independent and are located on different planes, but the same light guiding area as which of FIG. 8(a) can be acquired while seeing from a top view (the Y direction). In the second mode, the light guide plates 801, 803 and 805 overlap to form a smaller light guiding area, as shown in FIG. 8(*c*). FIG. 8(*d*) is a schematic diagram illustrating the structure while seeing in the X direction in FIG. 8(*c*). According to FIG. 8(*d*), the light guide plates 801, 803 and 805 overlap to form a smaller light guiding area.

There are many methods to implement the mechanisms that the light guiding adjusting area utilizes to control the optical touch control apparatus. For example, adjust the locations of the light guide plates via mechanic methods. Persons skilled in the art can easily under how to implement the control mechanism according to the concept of the present invention, thus it is omitted for brevity here. Additionally, the location relations between the light guide plate and other devices are not limited to above-mentioned embodiments. For example, in the embodiments shown in FIG. 5(*a*), FIG. 5(*b*) and FIG. 5(*c*), the locations of the light sources 503, 505 and 507 can be fixed, but these light sources can also moves following light guide plate's movement. Similarly, the locations of the light sources in the embodiments shown in FIG. 6(*a*) and FIG. 6(*b*), which provide light to the light guide plates 605, 607 and 609, can be fixed, but these light sources can also moves following movement of the light guide plates 605, 607 and 609. Additionally, the switching between the first mode and the second mode can be triggered by various mechanisms. For example, a hardware switch for switching can be provided on to the optical touch control apparatus. Alternatively, an user can set the mode via a computer. Such variation should also fall in the scope of the present application.

The above-mentioned light guide plate can include at least one of the following characteristics: the light guide plate changes a direction of the light; the light guide plate diffuses the light to generate diffused light, wherein intensity of the diffused light degrades corresponding to distance; the light guide plate enhances the intensity of the light, such that the object can be illuminated even it does not touch the image sensor.

Figure 9:
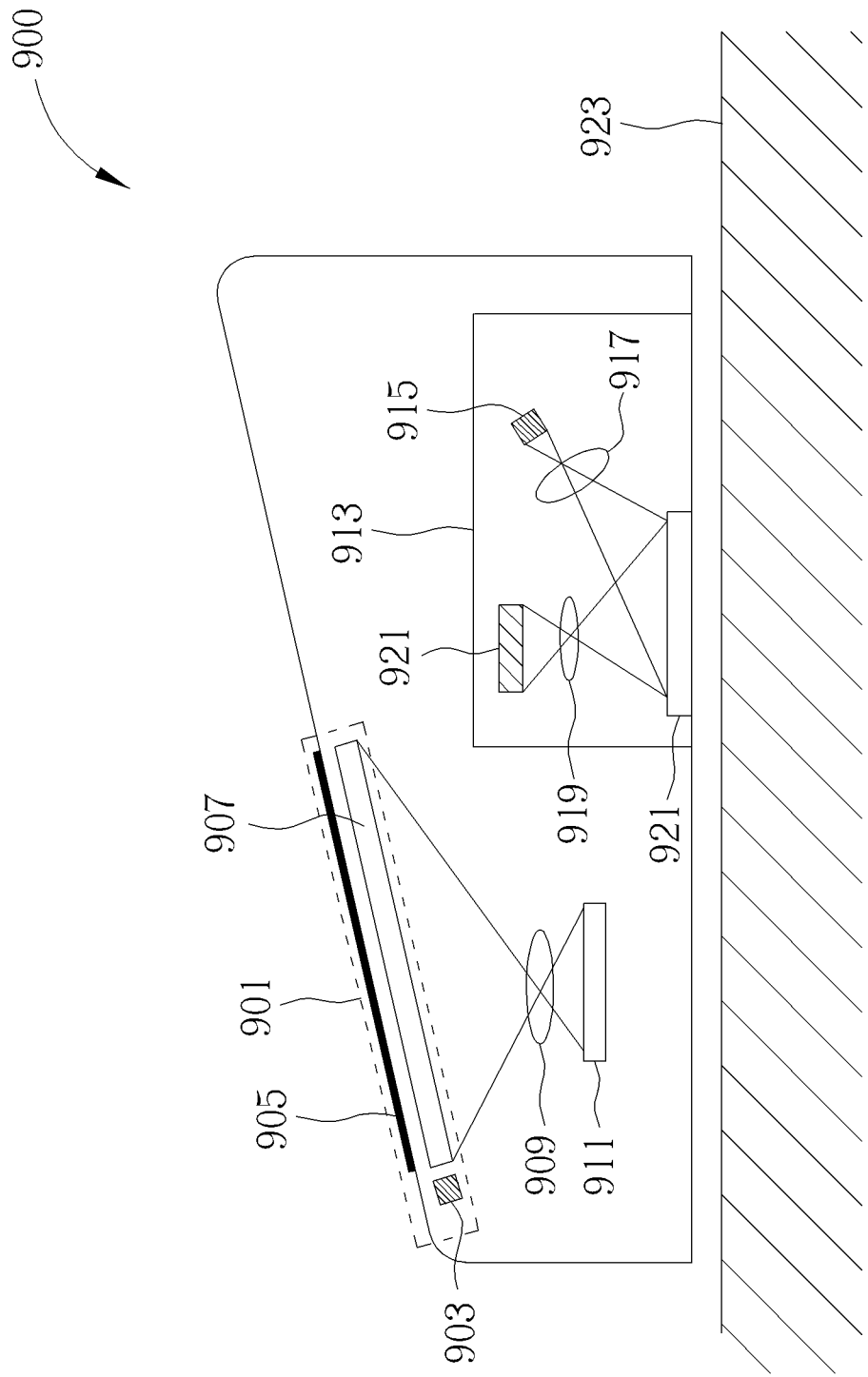
FIG. 9 and FIG. 10 are schematic diagrams respectively illustrating optical touch control and displacement detecting apparatuses according to embodiments of the present invention.

The adjustable light guide apparatus disclosed in above-mentioned embodiments not only can be applied to an optical touch control apparatus but also can be combined with a displacement detecting apparatus. FIG. 9 is a schematic diagram illustrating an optical touch control and displacement detecting apparatus 900 according to an embodiment of the present invention. As shown in FIG. 9, the optical touch control and displacement detecting apparatus 900 includes an object detecting apparatus 901, a lens 909 and an image sensor 911. The object detecting apparatus 901, the lens 909 and the image sensor 911 are utilized to perform above-mentioned optical touch control function. The object detecting apparatus 901 includes a light source 903, a detecting surface 905 and an adjustable light guide apparatus 907. The above-mentioned embodiments for the adjustable light guide apparatus all can be applied to implement the adjustable light guide apparatus 907. Since the optical touch control function performed by the object detecting apparatus 901, the lens 909 and the image sensor 911 has been detailedly depicted as above-mentioned, thus is omitted for brevity here.

Figure 10:
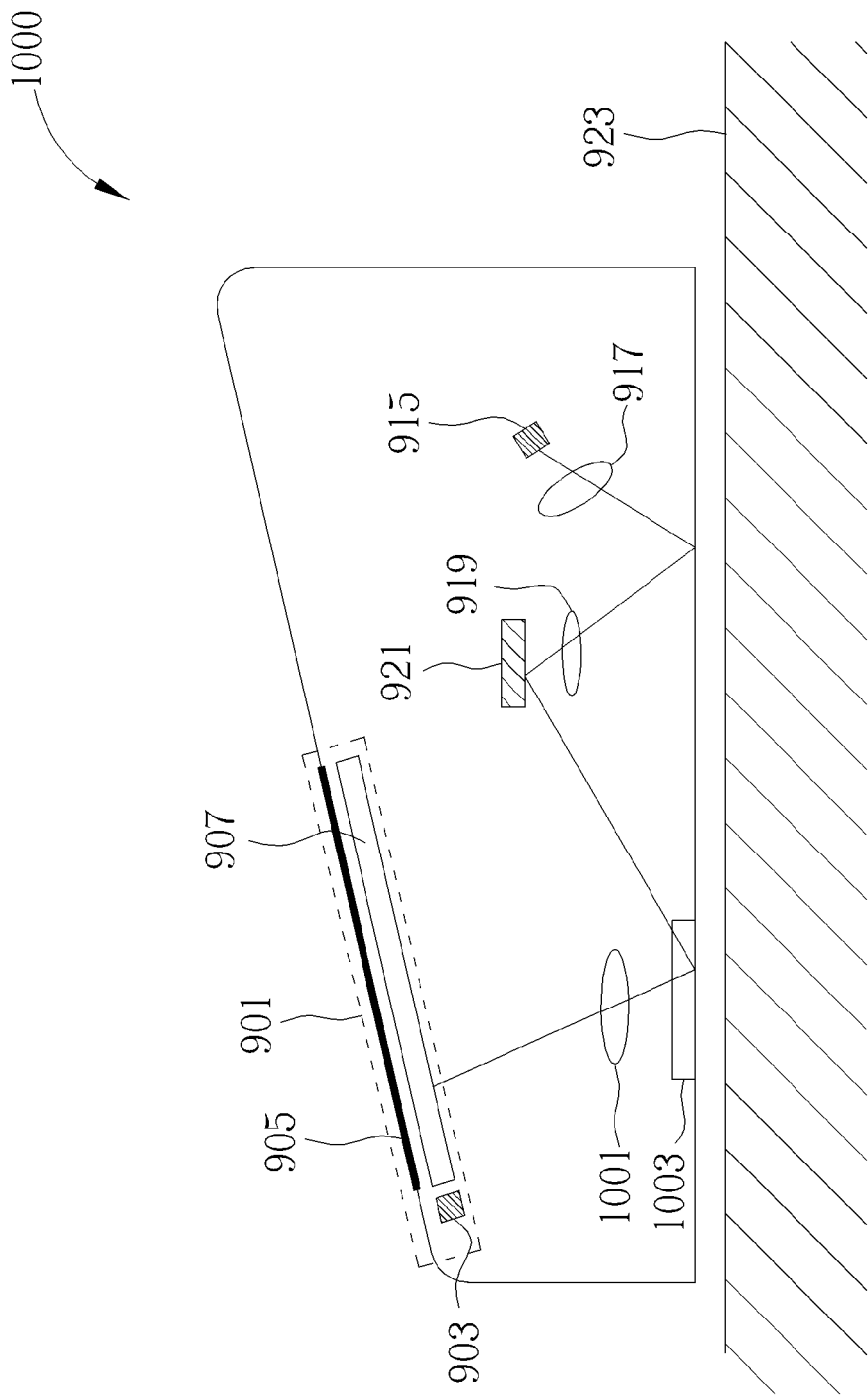

Additionally, the optical touch control and displacement detecting apparatus 900 can further include a displacement detecting unit 913, for detecting the displacement between the optical touch control and displacement detecting apparatus 900 and the surface 923. In this embodiment, the displacement detecting unit 913 include a light source 915, lenses 917, 919, an image sensor 921 and a reflection material layer 922, but do not limit to include these devices. The displacement detecting unit 913 can detect the displacement between the optical touch control and displacement detecting apparatus 900 and the surface 923. Please refer to FIG. 10, comparing with the optical touch control and displacement detecting apparatus 900, the optical touch control and displacement detecting apparatus 1000 includes no image sensor 911 but includes a lens 1001 and a reflection material layer 1003. The object image generated by the object detecting apparatus 901 can pass through the lens 1001 and can be received by the image sensor 921 via the reflection material layer 1003. By this way, the image sensor 921 which is originally utilized for displacement detecting can be utilized for optical touch control function.

Please note the above-mentioned adjustable light guide apparatus is not limited to the above-mentioned optical touch control apparatus or the optical touch control and displacement detecting apparatus. It can be applied to other apparatuses or be utilized alone.

Figure 3:
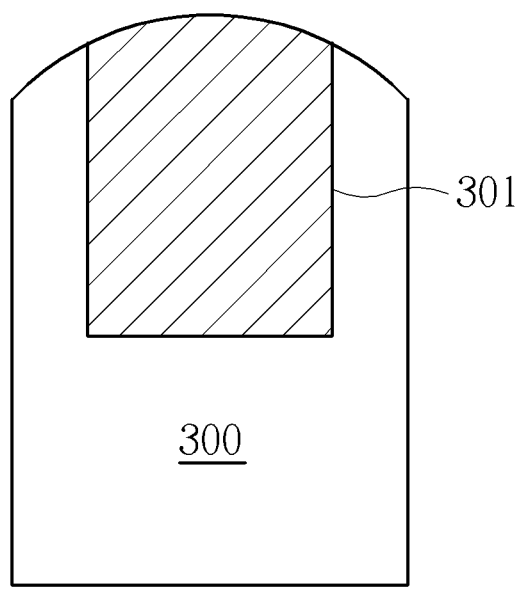
FIG. 3(a) and FIG. 3(b) are schematic diagrams illustrating optical touch control apparatuses according to embodiments of the present invention.
Figure 3:
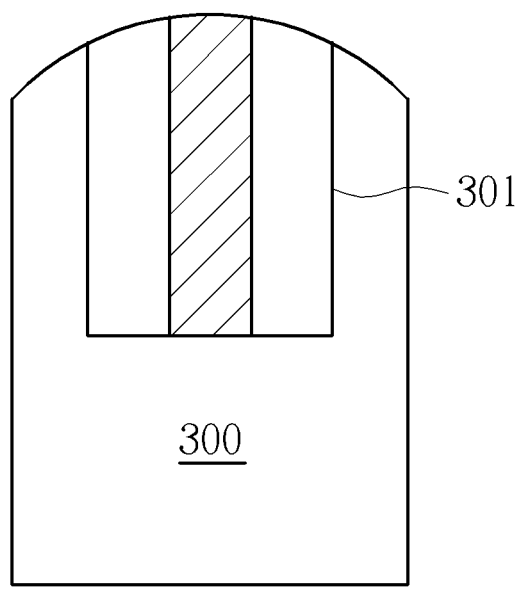
Figure 4:
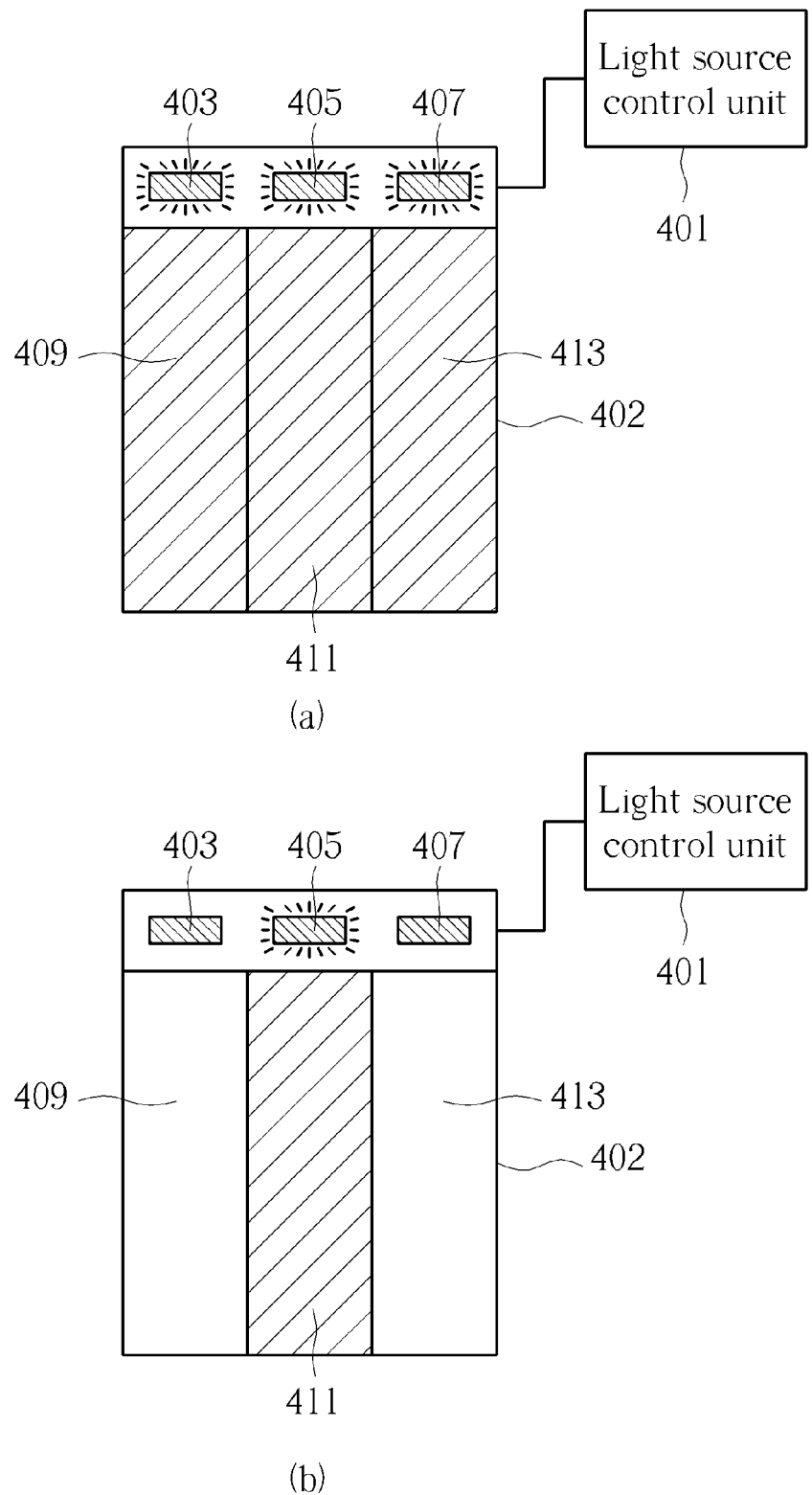
FIG. 4 to FIG. 8 are schematic diagram respectively illustrating adjustable light guide apparatuses according to embodiments of the present invention.
Figure 5:
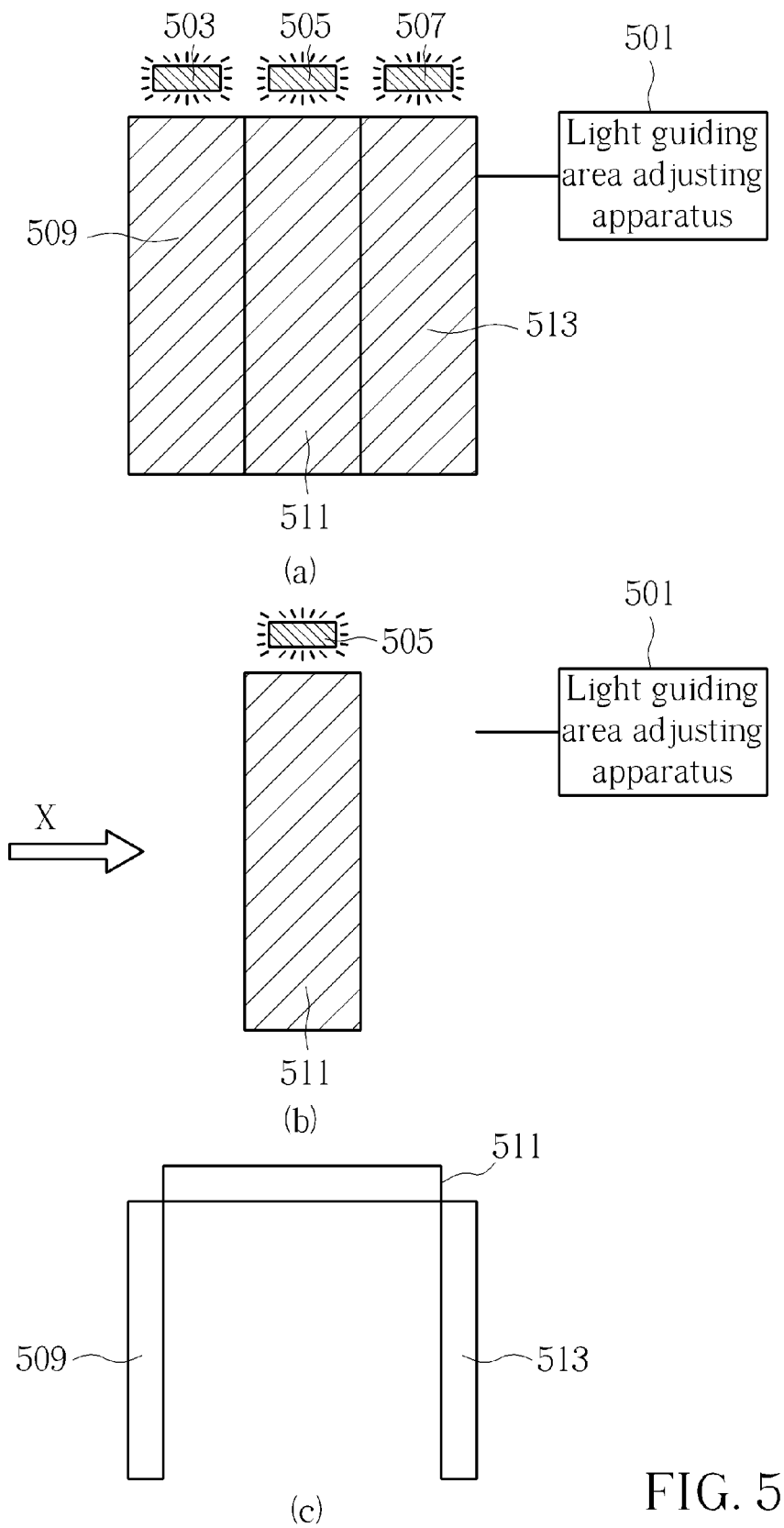

An optical touch control method can be acquired in view of above-mentioned embodiment. The optical touch control method is for detecting displacement between an object and an optical touch control apparatus and includes the following steps: Utilize a first detecting area of the object detecting apparatus to detect the object and thereby generate an object image in a first mode (ex. FIG. 3(*a*)) and utilize a second detecting area of the object detecting apparatus to detect the object and thereby generate an object image in a second mode (ex. FIG. 3(*b*)), wherein the first detecting area is larger than the second detecting area. Utilize an image sensor, to capture at least one frame of the object image. And adjust an image capturing area of the image sensor, according which one of the first detecting area and the second detecting area the object detecting apparatus utilizes.

Besides, an optical touch control and displacement detecting method for detecting displacement between an object and an optical touch control and displacement detecting apparatus, and displacement between a surface and an optical touch control and displacement detecting apparatus. The optical touch control and displacement detecting method includes the following steps: Utilize a displacement detecting unit (ex. 913 in FIG. 9) to detect the surface and the optical touch control and displacement detecting apparatus. Utilize a first detecting area of the object detecting apparatus (ex. 901 in FIG. 9) to detect the object and thereby generate an object image in a first mode and utilize a second detecting area of the object detecting apparatus to detect the object and thereby generate an object image in a second mode, wherein the first detecting area is larger than the second detecting area. Utilize an image sensor, to capture at least one frame of the object image. And adjust an image capturing area of the image sensor, according which one of the first detecting area and the second detecting area the object detecting apparatus utilizes.

In view of above-mentioned embodiment, the size of the light guiding area can be adjusted according to different requirements, to thereby adjust the sizes of the object detecting areas and to thereby adjust the image capturing range of the image sensor. By this way, the power efficiency can be optimized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical touch control apparatus, for detecting displacement between an object and the optical touch control apparatus, comprising:

an object detecting apparatus, for detecting the object to generate an object image, having a first detecting area in a first mode and having a second detecting area in a second mode, wherein the first detecting area is larger than the second detecting area;

an image sensor, for capturing at least one frame of the object image; and a control unit, for adjusting an image capturing area of the image sensor, according which one of the first detecting area and the second detecting area the object detecting apparatus utilizes.

2. The optical touch control apparatus of claim 1, wherein the object detecting apparatus comprises an adjustable light guide apparatus, which has a first light guiding area in the first mode and has a second light guiding area in the second mode;

wherein the first light guiding area is larger than the second light guiding area, the first light guiding area corresponds to the first detecting area and the second light guiding area corresponds to the second detecting area.

3. The optical touch control apparatus of claim 2, further comprising a light source control unit, wherein the adjustable light guide apparatus comprises a light guide plate and a plurality of light sources, where the light source control unit controls the illumination of the light sources such that the light sources generate the first light guiding area on the light guide plate in the first mode and generate the second light guiding area on the light guide plate in the second mode.

4. The optical touch control apparatus of claim 3, wherein the light guide plate includes at least one of the following characteristics: the light guide plate changes a direction of the light; the light guide plate diffuses the light, wherein intensity of the diffused light degrades corresponding to distance; the light guide plate enhances the intensity of the light, such that the object can be illuminated even it does not touch the image sensor.

5. The optical touch control apparatus of claim 3, wherein the control unit controls a first number of the light sources to illuminate to form the first light guiding area in the first mode, and controls a second number of the light sources to illuminate to form the second light guiding area in the second mode.

6. The optical touch control apparatus of claim 2, wherein the adjustable light guide apparatus includes a plurality of light guide plates, and includes a light guiding area adjusting apparatus, for controlling a first number of the light guide plates to form the first light guiding area in the first mode, and for controlling a second number of the light guide plates to form the second light guiding area in the second mode.

7. The optical touch control apparatus of claim 6, wherein the light guide plate includes at least one of the following characteristics: the light guide plate changes a direction of the light; the light guide plate diffuses the light, wherein intensity of the diffused light degrades corresponding to distance; the light guide plate enhances the intensity of the light, such that the object can be illuminated even it does not touch the image sensor.

8. The optical touch control apparatus of claim 6, wherein the object detecting apparatus comprising a first light guide plate, a second light guide plate and a third light guide plate;

where the first light guide plate, the second light guide plate and the third light guide plate form the first light guiding region, and the second light guide plate is located between the first light guide plate and the third light guide plate in the first mode;

wherein only the second light guide plate forms the second light guiding area in the second mode.

9. The optical touch control apparatus of claim 6, wherein the object detecting apparatus comprising a first light guide plate, a second light guide plate and a third light guide plate;

where the first light guide plate, the second light guide plate and the third light guide plate form the first light guiding region, and the second light guide plate is located between the first light guide plate and the third light guide plate in the first mode;

wherein the first light guide plate, the second light guide plate and the third light guide plate overlap to form the second light guiding region in the second mode.

10. The optical touch control apparatus of claim 9, wherein the first light guide plate is connected to the second light guide plate, and the second light guide plate is connected the third light guide plate; where the first light guide plate, the second light guide plate and the third light guide plate overlap via folding in the second mode.

11. The optical touch control apparatus of claim 9, wherein the first light guide plate, the second light guide plate and the third light guide plate are independent and on different planes.

12. An adjustable light guide apparatus, having a first light guiding area in a first mode and having a second light guiding area in a second mode, wherein the first light guiding area is larger than the second light guiding area, comprising:

a light source control unit;

a light guide plate; and a plurality of light sources;

wherein the light source control unit controls the illumination of the light sources such that the light sources generate the first light guiding area on the light guide plate in the first mode and generate the second light guiding area on the light guide plate in the second mode.

13. The adjustable light guide apparatus of claim 12, wherein the control unit controls a first number of the light sources to illuminate to form the first light guiding area in the first mode, and controls a second number of the light sources to illuminate to form the second light guiding area in the second mode.

14. The adjustable light guide apparatus of claim 12, wherein the light guide plate includes at least one of the following characteristics: the light guide plate changes a direction of the light; the light guide plate diffuses the light, wherein intensity of the diffused light degrades corresponding to distance; the light guide plate enhances the intensity of the light.

15. An adjustable light guide apparatus, having a first light guiding area in a first mode and having a second light guiding area in a second mode, wherein the first light guiding area is larger than the second light guiding area, comprising:

a plurality of light guide plates; and a light guiding area adjusting apparatus, for controlling a first number of the light guide plates to form the first light guiding area in the first mode, and for controlling a second number of the light guide plates to form the second light guiding area in the second mode.

16. The adjustable light guide apparatus of claim 15, comprising a first light guide plate, a second light guide plate and a third light guide plate;

wherein the first light guide plate, the second light guide plate and the third light guide plate form the first light guiding region, and the second light guide plate is located between the first light guide plate and the third light guide plate in the first mode;

where only the second light guide plate forms the second light guiding area in the second mode.

17. The adjustable light guide apparatus of claim 16, comprising a first light guide plate, a second light guide plate and a third light guide plate;
   wherein the first light guide plate, the second light guide plate and the third light guide plate form the first light guiding region, and the second light guide plate is located between the first light guide plate and the third light guide plate in the first mode;
   where the first light guide plate, the second light guide plate and the third light guide plate overlap to form the second light guiding region in the second mode.

18. The adjustable light guide apparatus of claim 17, wherein the first light guide plate is connected to the second light guide plate, and the second light guide plate is connected the third light guide plate; where the first light guide plate, the second light guide plate and the third light guide plate overlap via folding in the second mode.

19. The adjustable light guide apparatus of claim 17, wherein the first light guide plate, the second light guide plate and the third light guide plate are independent and on different planes.

20. The adjustable light guide apparatus of claim 15, wherein the light guide plate includes at least one of the following characteristics: the light guide plate changes a direction of the light; the light guide plate diffuses the light, wherein intensity of the diffused light degrades corresponding to distance; the light guide plate enhances the intensity of the light.

* * * * *